US008320852B2

(12) United States Patent
Lee

(10) Patent No.: US 8,320,852 B2
(45) Date of Patent: Nov. 27, 2012

(54) METHOD AND APPARATUS TO TRANSMIT SIGNALS IN A COMMUNICATION SYSTEM

(75) Inventor: Sang-Hoon Lee, Seoul (KR)

(73) Assignee: Samsung Electronic Co., Ltd., Suwon-si (KR)

( * ) Notice: Subject to any disclaimer, the term of this patent is extended or adjusted under 35 U.S.C. 154(b) by 370 days.

(21) Appl. No.: 12/570,230

(22) Filed: Sep. 30, 2009

(65) Prior Publication Data

US 2010/0267340 A1 Oct. 21, 2010

(30) Foreign Application Priority Data

Apr. 21, 2009 (KR) ........................ 10-2009-0034657
Jul. 15, 2009 (KR) ........................ 10-2009-0064323

(51) Int. Cl.
*H04B 1/04* (2006.01)

(52) U.S. Cl. ... 455/114.2; 455/69; 455/63.1; 455/67.11; 455/67.13; 455/67.14; 455/115.1; 455/115.2; 455/115.3; 455/115.4

(58) Field of Classification Search .................... 455/69, 455/63.1, 67.11, 67.13, 67.14, 114.2, 115.1–115.4
See application file for complete search history.

(56) References Cited

U.S. PATENT DOCUMENTS

| | | | | |
|---|---|---|---|---|
| 6,154,450 | A * | 11/2000 | Wallentin et al. | 370/311 |
| 6,526,261 | B1 * | 2/2003 | Takeuchi et al. | 455/69 |
| 7,319,884 | B2 * | 1/2008 | Suzuka et al. | 455/522 |
| 7,515,661 | B2 | 4/2009 | Kondo et al. | |
| 2006/0271358 | A1 | 11/2006 | Erell | |

FOREIGN PATENT DOCUMENTS

JP 2004046033 2/2004

* cited by examiner

*Primary Examiner* — Junpeng Chen
(74) *Attorney, Agent, or Firm* — Stanzione & Kim, LLP

(57) ABSTRACT

A method is provided to transmit a signal by a transmitter in a communication system. The method includes predicting a receiver noise signal received from a receiver, and increasing an intelligibility of a transmitter signal using the receiver noise signal. The transmitter signal includes a transmitter noise signal and a transmitter speech signal. The transmitter cancels the transmitter noise signal from the transmitter signal and intensifies the transmitter speech signal in consideration of the receiver noise signal.

9 Claims, 7 Drawing Sheets

METHOD AND APPARATUS TO TRANSMIT SIGNALS IN A COMMUNICATION SYSTEM

CROSS-REFERENCE TO RELATED APPLICATIONS

This application claims the benefit under 35 U.S.C. §119 (a) of a Korean Patent Application filed in the Korean Intellectual Property Office on Apr. 21, 2009 and assigned Serial No. 10-2009-0034657, and a Korean Patent Application filed in the Korean Intellectual Property Office on Jul. 15, 2009 and assigned Serial No. 10-2009-0064323, the entire disclosures of which are hereby incorporated by reference in their entirety.

BACKGROUND

1. Field of the Invention

The present general inventive concept relates to a method and apparatus to transmit signals in a communication system.

2. Description of the Related Art

In conventional communication systems, the following two methods may be used to improve intelligibility of speech signals. A first method involves canceling noise signals at a transmitter, and a second method involves increasing a sound pressure level (SPL) of speech signals at a receiver.

Of the two methods, the first method of canceling noise signals at a transmitter will be described below.

A transmitter signal, which is a speech source signal, is input to a conventional transmitter. The transmitter signal includes a speech signal (hereinafter referred to as a "transmitter speech signal") and/or a noise signal (hereinafter referred to as a "transmitter noise signal"). Therefore, the transmitter cancels the transmitter noise signal from the transmitter signal to prevent the intelligibility level of the transmitter speech signal from dropping due to the transmitter noise signal.

The transmitter transmits the transmitter speech signal, from which the transmitter noise signal is cancelled, to a receiver. Then the receiver can receive a more articulated speech signal, by receiving the transmitter signal from which the transmitter noise signal is cancelled, from the transmitter.

The second method of increasing a sound pressure level of a speech signal at the receiver to improve intelligibility of the speech signal will be described.

Sound pressure level, or SPL, is a measure of a deviation of pressure from a reference level. The reference level may be an ambient level, or a level at which a human may hear the speech, for example. A speech pressure level may be measured by a microphone when the speech is travelling through air.

A receiver signal, which is a speech source signal, is input into a conventional receiver. The receiver signal, like the transmitter signal, includes a speech signal (hereinafter referred to as a "receiver speech signal") and/or a noise signal (hereinafter referred to as a "receiver noise signal"). The receiver predicts or analyzes the receiver noise signal from the receiver signal.

When the transmitter signal is received, the receiver increases a sound pressure level of the received transmitter speech signal to prevent an intelligibility level of the transmitter speech signal from falling due to the receiver noise signal. The intelligibility level measured by a ratio of speech to noise in a signal. For example, if a signal has a speech signal with a high magnitude relative to a noise signal, it has good intelligibility or a high level of intelligibility.

Therefore, since the output receiver speech signal is greater in intensity than the receiver noise signal at the receiver, a user of the receiver can listen to a more articulated receiver speech signal.

In this way, in the conventional communication system, the process of canceling the transmitter noise signal at the transmitter and the process of increasing an SPL of the received transmitter speech signal at the receiver are performed independently to improve intelligibility of the speech signal.

However, cancelling the noise signal may cause a variation in the transmitter, and when the sound pressure level of the received transmitter speech signal is increased at the receiver, a variation in the transmitter speech signal may once again. In other words, cancelling the noise signal at the receiver may cause a first variation of a speech signal, and increasing a sound pressure level may cause another variation of the same speech signal.

As a result, in the conventional communication system, as the transmitter and the receiver individually use the methods to improve intelligibility of the speech signal, the speech signal may be subject to variation twice.

Meanwhile, in the conventional communication system, when canceling the noise signal from the transmitter signal, the transmitter should accurately determine a noise signal cancellation, i.e., an amount of the noise signal it will cancel based on a predicted noise signal.

If the determined noise signal cancellation is greater than an actual noise signal level, the speech signal may be distorted. However, when the determined noise signal cancellation is less than the actual noise signal level, the noise signal may still exist.

When the noise signal cancellation cannot be exactly determined, intelligibility of the speech signal may deteriorate. Hence, there is a need for a method and apparatus to accurately determine the noise signal cancellation in the conventional communication system.

SUMMARY

The present general inventive concept addresses at least the above-mentioned problems and/or disadvantages and provides at least the advantages described below. The present general inventive concept provides a speech signal transmission method and apparatus to cancel a transmitter noise signal from a transmitter signal in a communication system.

The present general inventive concept provides a speech signal transmission method and apparatus to cancel a transmitter noise signal from a transmitter signal and to enhance a transmitter speech signal from which the transmitter noise signal is cancelled, while taking a receiver noise signal into account.

Additionally, the present general inventive concept provides a speech signal transmission method and apparatus in which a transmitter predicts a receiver noise signal and transmits a speech signal using the same in a communication system.

The present general inventive concept provides a speech signal transmission method and apparatus to predict a receiver noise signal and to enhance a transmitter speech signal while taking the predicted receiver noise signal into account.

The present general inventive concept provides a speech signal transmission method and apparatus to enhance a transmitter speech signal while taking a predicted receiver noise signal into account, and to cancel an additional noise signal existing in the intensified transmitter speech signal in a communication system.

The present general inventive concept may include a method to transmit a signal by a transmitter in a communication system. The method may include predicting a receiver noise signal received from a receiver and increasing an intelligibility of a transmitter signal using the receiver noise signal. The transmitter signal may include a transmitter noise signal and a transmitter speech signal.

The present general inventive concept may be realized by providing a transmitter to transmit a signal in a communication system. The transmitter may include a receiver noise analyzer to analyze a receiver noise signal based on a received signal from a receiver, and an intelligibility increasing device to increase an intelligibility of a transmitter signal using the receiver noise signal. The transmitter signal includes a transmitter noise signal and a transmitter speech signal.

BRIEF DESCRIPTION OF THE DRAWINGS

The above and other aspects and/or utilities of certain exemplary embodiments of the present general inventive concept will be more apparent from the following description taken in conjunction with the accompanying drawings, in which.

DETAILED DESCRIPTION OF THE EMBODIMENTS

Figure 1:
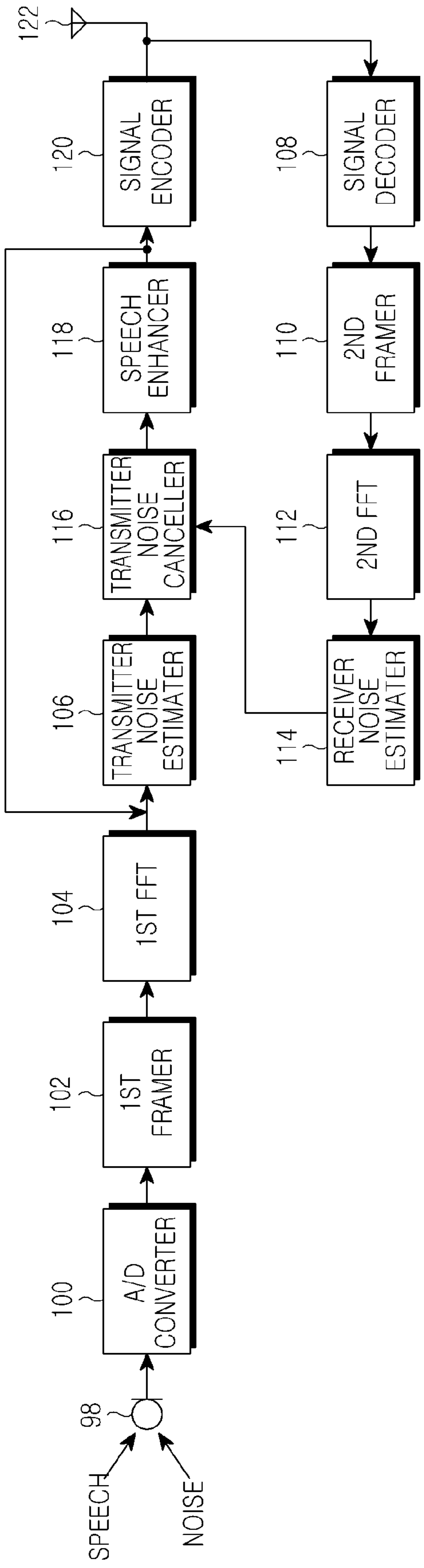
FIG. 1 illustrates a structure of a transmitter to improve intelligibility of a speech signal according to an embodiment of the present general inventive concept.

The matters defined in the description such as a detailed construction and elements are provided to assist in a comprehensive understanding of exemplary embodiments of the general inventive concept. Accordingly, those of ordinary skill in the art will recognize that various changes and modifications of the embodiments described herein can be made without departing from the scope and spirit of the general inventive concept. Also, descriptions of well-known functions and constructions are omitted for clarity and conciseness.

Reference will now be made in detail to the embodiments of the present general inventive concept, examples of which are illustrated in the accompanying drawings, wherein like reference numerals refer to the like elements throughout. The embodiments are described below to explain the present general inventive concept by referring to the figures.

It should be understood that the singular forms "a," "an," and "the" include plural referents unless the context clearly dictates otherwise. Thus, for example, reference to "a speech signal" includes reference to one or more of such speech signals.

The present general inventive concept provides a method and apparatus to allow a speech signal transmitted from a transmitter to be output more articulately at a receiver in a communication system. In addition, the present general inventive concept provides a method and apparatus to improve intelligibility of a transmitter speech signal taking a receiver noise signal into account in a transmitter.

FIG. 1 illustrates a structure of a transmitter to improve intelligibility of a speech signal according to an embodiment of the present general inventive concept.

Referring to FIG. 1, a transmitter may include a microphone 98, an Analog-to-Digital (A/D) converter 100, a first framer 102, a first Fast Fourier Transform (FFT) unit 104, a transmitter noise estimator 106, a signal decoder 108, a second framer 110, a second FFT unit 112, a receiver noise estimator 114, a transmitter noise canceller 116, a speech enhancer 118, a signal encoder 120, and an antenna 122.

When a transmitter signal, or a speech source signal, is input through the microphone, the A/D converter 100 converts the analog transmitter signal into a digital signal. The transmitter signal may include a speech signal and/or a noise signal.

The first framer 102 divides the A/D-converted transmitter signal into units of a predetermined frame. The first FFT unit 104 transforms the transmitter signal divided on a frame-by-frame basis into a frequency-domain signal by performing FFT. The first FFT unit 104 outputs the frequency-domain signal transformed from the transmitter signal to the transmitter noise estimator 106 frame by frame.

The transmitter noise estimator 106 determines if each frame of the transmitter signal is a frame with a speech signal, or a frame with a noise signal. The transmitter noise estimator 106 may estimate the noise signal by distinguishing which frames contain a noise signal.

In accordance with an embodiment of the present general inventive concept, the transmitter noise estimator 106 compares a magnitude of a frequency component of the current frame with a magnitude of a frequency component of the noise predicted in the previous frame. When a specific frequency component of the current frame is greater in magnitude than a frequency component of the noise predicted in the previous frame, the transmitter noise estimator 106 determines that the specific frequency component is a frequency component with a speech signal.

On the other hand, if a specific frequency component of the current frame is less than or equal to a frequency component of the noise predicted in the previous frame in terms of the magnitude, the transmitter noise estimator 106 changes a noise prediction value according to the magnitude of the frequency component of the current frame, determining the specific frequency as a frequency including only a noise signal.

Meanwhile, the transmitter noise estimator 106 can predict the frame with a noise signal using different types of Voice Activity Detection (VAD) algorithms, according to an embodiment of the present general inventive concept.

Information about the predicted noise signal (hereinafter referred to as a "transmitter noise signal") is output to the transmitter noise canceller 116 along with the transmitter signal.

In the meantime, when a packet signal including coding rate information and an encoded signal is received through the antenna 122, the signal decoder 108 decodes the encoded signal included in the packet signal using the coding rate information included in the packet signal. The encoded signal included in the packet signal can be a speech signal and/or a noise signal (hereafter referred to as a "receiver signal") which is input to the receiver, and the receiver signal is included in the packet signal frame by frame.

The coding rate is included in the packet signal with a different value according to whether the encoded signal is a speech signal or a noise signal. The packet signal is generated in the receiver, and a generation process of the packet signal will be described in detail below.

The second framer 110 divides the decoded receiver signal frame by frame. The second FFT unit 112 transforms the receiver signal divided on a frame-by-frame basis into a frequency-domain signal by performing FFT. The frequency-domain signal transformed from the receiver signal is output to the receiver noise estimator 114 frame by frame.

Although the first FFT unit 104 and the second FFT unit 112 are separately provided in FIG. 1, they may also be made as an integrated single FFT unit according to an embodiment of the present general inventive concept.

As described previously, coding rates of the speech signal and the noise signal included in the packet signal are set to different values. Accordingly, the receiver noise estimator 114 determines if each frame of the receiver signal includes a speech signal or a noise signal, using the coding rate information.

If a noise signal is included in the frame, the receiver noise estimator 114 detects an energy level of each frequency component of the noise signal included in the frame. The receiver noise estimator 114 detects an energy level of each frequency component of the noise signal in the same manner even in the remaining frames of the receiver signal.

For each frame, the receiver noise estimator 114 calculates a masking threshold of the receiver noise signal using the detected energy level of each frequency component of the noise signal. Subsequently, the receiver noise estimator 114 outputs the calculated masking threshold of the receiver noise signal to the transmitter noise canceller 116 on a frame-by-frame basis.

The transmitter noise canceller 116 compares frequency magnitudes of the transmitter noise signal and the receiver noise signal, using the information about the transmitter noise signal, which is output from the transmitter noise estimator 106, and the masking threshold of the receiver noise signal, which is output from the receiver noise estimator 114. That is, the transmitter noise canceller 116 determines if a masking phenomenon occurs by comparing the frequency magnitude of the transmitter noise signal with the masking threshold of the receiver noise signal.

The term "masking phenomenon," which is the concept disclosed in psychoacoustics, refers to a phenomenon in which when two or more speech source signals coexist, one speech source signal is covered (or masked) with another speech source signal, so it cannot be perceived by the ear of a human being.

For example, in a case where a speech signal and a noise signal coexist, if the speech signal has a sound pressure level greater than the noise signal in a specific frequency band, the noise signal is inaudible to the human ear as it is masked with the speech signal. In contrast, if the speech signal has a sound pressure level less than the noise signal, only the noise signal is audible to the human ear as the speech signal is masked with the noise signal.

Meanwhile, a masking threshold should be calculated in a frequency domain to exactly determine occurrence/non-occurrence of the masking phenomenon.

For example, assuming that a speech signal and a noise signal coexist as in the above example, if a masking threshold of the speech signal is greater than a sound pressure level of the noise signal, it can be determined that the noise signal is inaudible to the ear of a human being. However, if the masking threshold of the speech signal is less than the SPL of the noise signal, it can be determined that the noise signal is audible to the human ear. That is, the use of the masking threshold makes it possible to exactly determine occurrence/non-occurrence of the masking phenomenon.

Based on the foregoing, the transmitter noise canceller 116 determines that the transmitter noise signal is not masked by the receiver noise signal when a sound pressure level, or a frequency magnitude, of the transmitter noise signal is greater than or equal to a masking threshold of the receiver noise signal. That is, the transmitter noise canceller 116 determines that the transmitter noise signal may be heard by the user of the receiver.

Thus, the transmitter noise canceller 116 decreases a frequency magnitude of the transmitter noise signal using the information about the transmitter noise signal input into the transmitter noise canceller so that the transmitter noise signal becomes less than the receiver noise signal in frequency magnitude or sound pressure level. As a result, the transmitter noise signal is cancelled from the transmitter signal.

However, if a frequency magnitude of the transmitter noise signal is less than a masking threshold of the receiver noise signal, the transmitter noise canceller 116 determines that the transmitter noise signal is masked by the receiver noise signal. That is, the transmitter noise canceller 116 determines that the transmitter noise signal is not heard by the user of the receiver and does not cancel the transmitter noise signal. Instead, the transmitter noise canceller 116 increases a sound pressure level (SPL) of the entire transmitter signal within a range where the transmitter noise signal is not greater than the receiver noise signal in frequency magnitude to make a speech signal included in the transmitter signal (hereinafter referred to as a "transmitter speech signal") more articulated. As a result, the SPL of the transmitter speech signal also increases together, so that a ratio between the transmitter speech signal to the receiver noise signal, i.e., a signal-to-noise ratio, increases, thereby improving intelligibility of the transmitter speech signal.

Meanwhile, the transmitter noise canceller 116 can cancel the transmitter noise signal for each individual frequency, or increase an SPL of the transmitter speech signal for each individual frequency. However, an embodiment of the present general inventive concept may use the following method to prevent the transmitter speech signal from being distorted. An embodiment of the present general inventive concept may include a method to divide a frequency domain of the transmitter signal and the receiver signal into critical bands, and to adjust a frequency magnitude of each critical band individually.

Thus, the transmitter noise canceller 116 determines occurrence/non-occurrence of the masking phenomenon for each individual critical band by comparing a frequency magnitude of the transmitter noise signal with a masking threshold of the receiver noise signal with respect to each individual critical band. The transmitter noise canceller 116 decreases a frequency magnitude of the transmitter noise signal in the pertinent critical band based on the determination result.

Alternatively, the transmitter noise canceller 116 may compare a masking threshold of the transmitter speech signal with a frequency magnitude of the transmitter noise signal. This method to calculate the masking threshold of the transmitter speech signal is similar to the above-described method of calculating the masking threshold of the receiver noise signal. That is, the masking threshold of the transmitter speech signal is calculated by distinguishing frequency components including the transmitter speech signal and by using frequency energy of the transmitter speech signal included in each of the distinguished frequency components.

According to this embodiment, when the masking threshold of the transmitter speech signal is greater than the frequency magnitude of the transmitter noise signal, the transmitter noise canceller 116 does not cancel the transmitter noise signal because the transmitter noise signal is masked by the transmitter speech signal. In contrast, if the masking threshold of the transmitter speech signal is less than or equal to the frequency magnitude of the transmitter noise signal, the transmitter speech signal is masked by the transmitter noise signal. Therefore, the transmitter noise canceller 116 cancels the transmitter noise signal by reducing the frequency magnitude of the transmitter noise signal so that the transmitter noise signal may be less than the transmitter speech signal.

After fully completing the process described above of comparing the frequency magnitude of the transmitter noise signal with the masking threshold of the receiver (or, alternatively, the masking threshold of the transmitter speech signal), the transmitter noise canceller 116 outputs the transmitter signal and the masking threshold of the receiver noise signal to the speech enhancer 118. The speech enhancer 118 compares the frequency magnitude of the transmitter speech signal with the masking threshold of the receiver noise signal to measure intelligibility of the transmitter signal.

In accordance with an embodiment of the present general inventive concept, the frequency magnitude of the transmitter speech signal can be compared with the masking threshold of the receiver noise signal regarding each individual critical band. That is, the speech enhancer 118 compares the frequency magnitude of the transmitter speech signal with the masking threshold of the receiver noise signal for each individual critical band and decides whether to increase the frequency magnitude of the transmitter speech signal included in the critical band according to the comparison result.

If the frequency magnitude of the transmitter speech signal is less than the masking threshold of the receiver noise signal in a specific critical band, the speech enhancer 118 increases the frequency magnitude of the transmitter speech signal included in the specific critical band so that the frequency magnitude of the transmitter speech signal is greater than the masking threshold of the receiver noise signal. When the frequency magnitude of the transmitter speech signal is increased, if there is a residual transmitter noise signal that has not been completely canceled in the transmitter noise canceller 116, the frequency magnitude of the residual transmitter noise signal may also be increased.

Accordingly, the speech enhancer 118 outputs the frequency magnitude-increased transmitter signal back to the transmitter noise estimator 106. Then the transmitter noise estimator 106 estimates a noise signal from the frequency magnitude-increased transmitter signal, and the transmitter noise canceller 116 decides whether to cancel the noise signal by comparing the frequency magnitude-increased transmitter noise signal with the masking threshold of the receiver noise signal.

The above process is repeated until it is determined in the speech enhancer 118 that a frequency magnitude of the frequency magnitude-increased transmitter speech signal is greater than the masking threshold of the receiver noise signal.

On the other hand, if the frequency magnitude of the transmitter speech signal is greater than the masking threshold of the receiver noise signal in a specific critical band, the speech enhancer 118 determines that the transmitter speech signal is articulated and does not increase the frequency magnitude of the transmitter speech signal included in the specific critical band.

The speech enhancer 118 synthesizes the transmitter signal that is divided frame by frame, and outputs the synthesized transmitter signal to the signal encoder 120.

In an alternative method, the speech enhancer 118 may also determine if the transmitter speech signal is articulated or not, using the following method according to an embodiment of the present general inventive concept.

The speech enhancer 118 may calculate a frequency magnitude for each of the transmitter speech signal and the receiver noise signal with regard to each critical band and compute a ratio of the two calculated values. The speech enhancer 118 calculates an intelligibility value corresponding to the entire critical band by rating the computed ratio for each critical band and then summing them.

Further, the speech enhancer 118 determines if the transmitter speech signal is articulated by comparing the calculated intelligibility value with a defined threshold. If it is determined that the transmitter speech signal is articulated, the speech enhancer 118 synthesizes the transmitter signal that is divided frame by frame and outputs the synthesized transmitter signal to the signal encoder 120.

The signal encoder 120 encodes the transmitter signal output from the speech enhancer 118. The transmitter signal may undergo code excitation linear prediction (CELP) coding according to an embodiment of the present general inventive concept. The encoded transmitter signal is transmitted to the receiver via the antenna.

As described above, in an embodiment of the present general inventive concept, because the transmitter can consider not only the transmitter's noise signal but also the receiver's noise signal, the transmitter can accurately determine a noise signal level to be cancelled from the transmitter signal. In addition, the transmitter can prevent distortion of the speech signal and transmit the more articulated speech signal to the receiver.

The transmitter described above includes both the speech enhancer 118 to enhance the transmitter signal and the receiver noise estimator 114 to estimate the receiver noise signal. However, those of ordinary skill in the art will recognize that the speech enhancer 118 and the receiver noise estimator 114 may be selectively included in, or excluded from, the transmitter according to an embodiment of the present general inventive concept.

Figure 2:
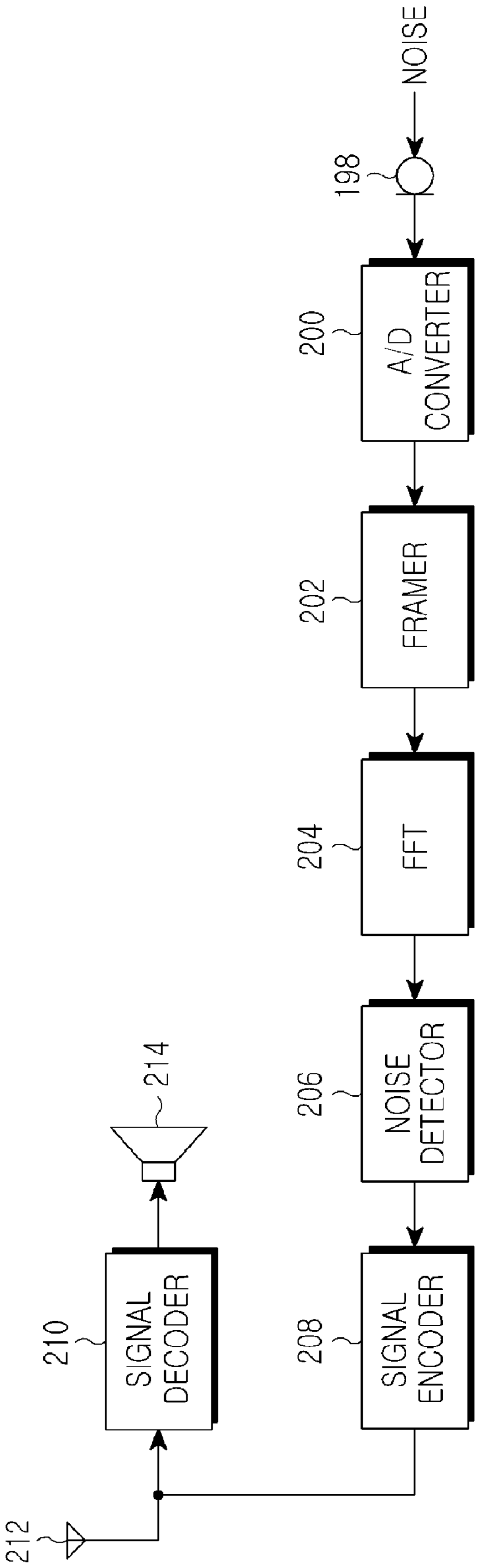
FIG. 2 illustrates a structure of a receiver to improve intelligibility of a speech signal according to an embodiment of the present general inventive concept.

FIG. 2 illustrates a structure of a receiver to improve intelligibility of a speech signal according to an embodiment of the present general inventive concept.

Referring to FIG. 2, a receiver may include a microphone 198, an A/D converter 200, a framer 202, an FFT unit 204, a noise detector 206, a signal encoder 208, a signal decoder 210, an antenna 212, and a speaker 214.

When a receiver signal, or a speech source signal, is input through the microphone 198, the ND converter 200 converts the analog receiver signal into a digital signal. The receiver signal may include a speech signal and/or a noise signal.

The framer 202 divides the A/D-converted receiver signal in units of a predetermined frame. The FFT unit 204 transforms the receiver signal divided on a frame-by-frame basis into a frequency-domain signal by performing FFT. The FFT unit 204 outputs the frequency-domain signal transformed from the receiver signal to the noise detector 206 on a frame-by-frame basis.

The noise detector 206 detects a noise signal by determining whether the current input frame is a frame with a speech signal or a frame with a noise signal. A method to detect the noise signal at the noise detector 206 is similar to the above-described method to predict the noise signal at the transmitter noise estimator 106 in the transmitter, so a detailed description thereof will be omitted.

The noise detector 206 can divide the receiver signal into a frame with a speech signal and a frame with a noise signal according to the above noise signal detection process. The noise detector 206 outputs information to identify of the speech signal frame and the noise signal frame (hereinafter referred to as "signal identification information") to the signal encoder 208 along with the receiver signal.

Thus, the signal encoder 208 can distinguish a speech signal frame and a noise signal frame from the receiver signal using the signal identification information, and encode the distinguished speech signal frame and noise signal frame using different coding rates, respectively. Herein, the speech signal and the noise signal may undergo, for example, code excitation linear prediction coding.

The signal encoder 208 generates a packet signal that includes the encoded signal and coding rate information corresponding to the encoded signal. The encoded signal may be included in the packet signal on a frame-by-frame basis. The packet signal generated by the signal encoder 208 is transmitted to the transmitter through the antenna 212.

When the transmitter signal is received from the transmitter via the antenna, the signal decoder 210 decodes the received transmitter signal. Then the speaker 214 outputs the decoded transmitter signal to the outside.

As described above, the receiver proposed by the present general inventive concept generates a packet signal and transmits it to the transmitter so that the transmitter may identify a noise signal that is input to the receiver. Therefore, the transmitter can determine if the received signal is a speech signal or a noise signal, using the coding rate information included in the packet signal.

In addition, because the receiver receives from the transmitter the speech signal that has already been articulated, the receiver has no need to separately perform the process of increasing a frequency magnitude of the received speech signal.

Next, operations of the transmitter and the receiver will be described in detail with reference to FIGS. 3 and 4, respectively.

Figure 3:
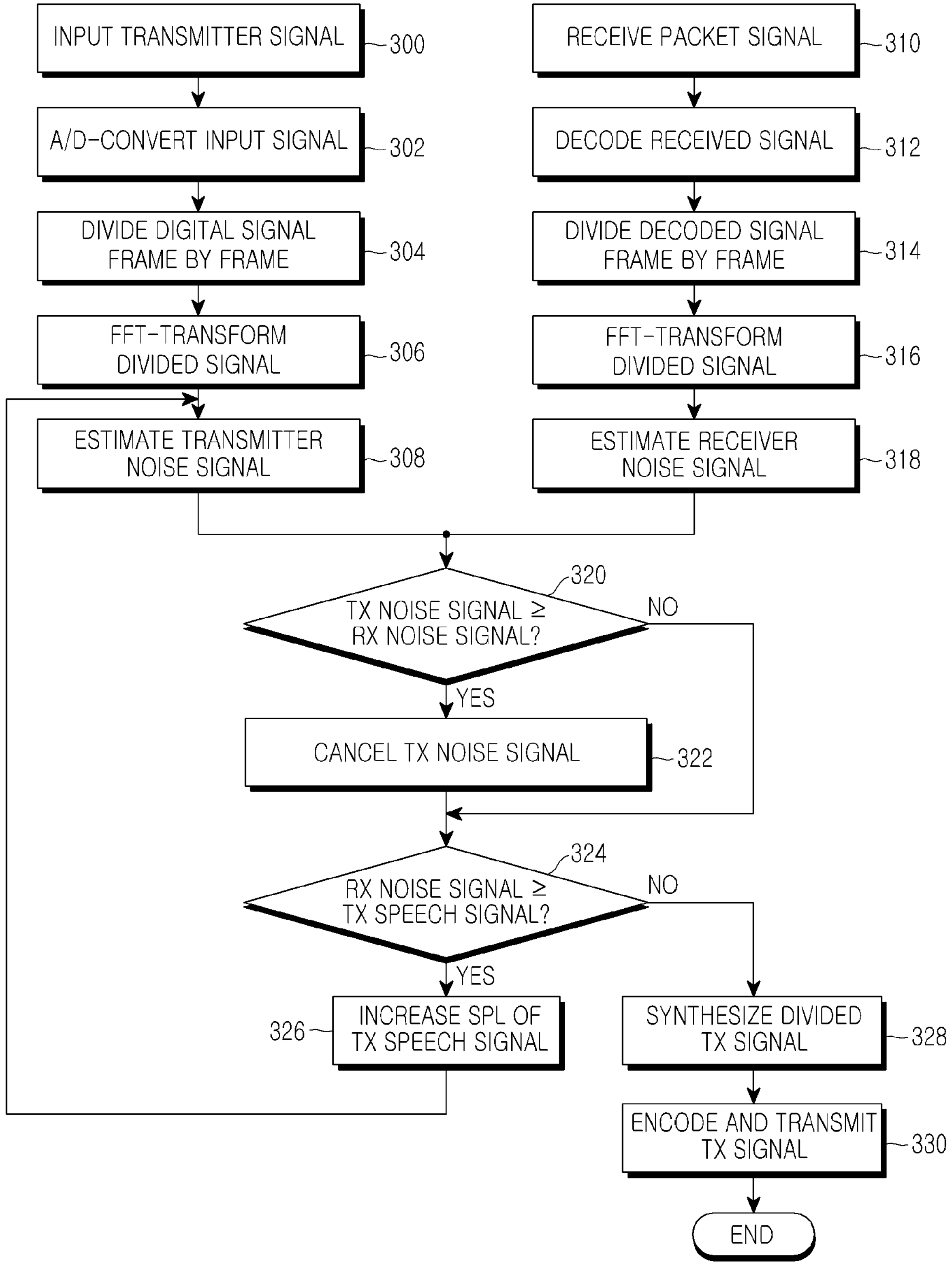
FIG. 3 illustrates an operation of a transmitter to improve intelligibility of a speech signal according to an embodiment of the present general inventive concept.

FIG. 3 illustrates an operation of a transmitter to improve intelligibility of a speech signal according to an embodiment of the present general inventive concept. For a better understanding of the present general inventive concept, a description of FIG. 3 will be given with reference to the above-described structure of the transmitter in FIG. 1.

Referring to FIG. 3, when a transmitter signal, i.e., a speech signal and/or a noise signal, is input via the microphone 98 in operation 300, the A/D converter 100 converts the input transmitter signal into a digital signal in operation 302.

In operation 304, the first framer 102 divides the A/D-converted transmitter signal on a frame-by-frame basis. In operation 306, the first FFT unit 104 transforms the transmitter signal divided on a frame-by-frame basis into a frequency-domain signal by performing FFT. The frequency-domain signal transformed from the transmitter signal in the first FFT unit 104 is output to the transmitter noise estimator 106 on a frame-by-frame basis.

Then the transmitter noise estimator 106 determines in operation 308 if a specific frame is a frame with a speech signal or a frame with a noise signal with regard to each frame of the transmitter signal. The transmitter noise estimator 106 estimates a transmitter noise signal by distinguishing the frame with a noise signal from input frames, and outputs information about the transmitter noise signal to the transmitter noise canceller 116 along with the transmitter signal.

In operation 310, the signal decoder 108 receives a packet signal including coding rate information and an encoded signal, which is transmitted from a receiver, via the antenna 122. In operation 312, the signal decoder 108 decodes the encoded signal included in the packet signal using the coding rate information included in the packet signal.

In operation 314, the second framer 110 divides the decoded receiver signal in units of a predetermined frame. Thereafter, in operation 316, the second FFT unit 112 FFT-transforms the receiver signal divided on a frame-by-frame basis into a frequency-domain signal, and outputs the frequency-domain signal transformed from the receiver signal to the receiver noise estimator 114 on the frame-by-frame basis.

In operation 318, the receiver noise estimator 114 predicts a receiver noise signal from the input frame.

More specifically, the receiver noise estimator 114 determines if each frame of the receiver signal is a frame with a speech signal or a frame with a noise signal, using the coding rate information included in the packet signal.

If a specific frame is a frame with a noise signal, the receiver noise estimator 114 detects an energy level of each frequency component of the noise signal. The receiver noise estimator 114 detects an energy level of each frequency component of the noise signal in the same manner even in the remaining frames of the receiver signal.

The receiver noise estimator 114 calculates a masking threshold of the receiver noise signal with respect to each frame using the detected energy level of each frequency component of the noise signal. The masking threshold of the receiver noise signal, which is calculated by receiver noise estimator 114, is output to the transmitter noise canceller 116 on a frame-by-frame basis.

In operation 320, the transmitter noise canceller 116 compares a frequency magnitude of the transmitter noise signal with a frequency magnitude of the receiver noise signal, using the information about the transmitter noise signal from the transmitter noise estimator 106 and the masking threshold of the receiver noise signal from the receiver noise estimator 114. Here, the transmitter noise canceller 116 determines occurrence/non-occurrence of the masking phenomenon with regard to each critical band, by comparing the frequency magnitude of the transmitter noise signal with the masking threshold of the receiver noise signal for each critical band.

If the frequency magnitude of the transmitter noise signal is greater than or equal to the masking threshold of the receiver noise signal in a specific critical band, the transmitter noise canceller 116 cancels the transmitter noise signal in the specific critical band in operation 322. That is, in operation 322, the transmitter noise canceller 116 reduces the frequency magnitude of the transmitter noise signal in the specific critical band so that the frequency magnitude of the transmitter noise signal is lower than the masking threshold of the receiver noise signal.

However, if the frequency magnitude of the transmitter noise signal is less than the masking threshold of the receiver noise signal in the specific critical band in operation 320, the transmitter noise canceller 116 proceeds to operation 324.

Although not illustrated in FIG. 3, after operation 322, the transmitter noise canceller 116 may compare a masking threshold of the transmitter speech signal with a frequency magnitude of the transmitter noise signal regarding each critical band.

If the masking threshold of the transmitter speech signal is less than or equal to the frequency magnitude of the transmitter noise signal in a specific critical band, the transmitter noise canceller 116 cancels the transmitter noise signal in the specific critical band.

To be specific, the transmitter noise canceller 116 decreases the frequency magnitude of the transmitter noise signal in the specific critical band so that the frequency magnitude of the transmitter noise signal is less than the masking threshold of the transmitter noise signal. This is because a user of the receiver may not articulately listen to the transmitter speech signal as the transmitter speech signal is masked with the transmitter noise signal.

However, the transmitter noise canceller 116 does not cancel the transmitter noise signal, when the masking threshold of the transmitter speech signal is greater than the frequency magnitude of the transmitter noise signal in the specific critical band. This is because, as the transmitter noise signal is masked with the transmitter speech signal, the user of the receiver cannot hear the transmitter noise signal even though the transmitter noise signal is not cancelled.

In operation 324, the speech enhancer 118 compares the masking threshold of the receiver noise signal with the frequency magnitude of the transmitter speech signal regarding each critical band. This process is performed to determine if the transmitter speech signal is masked with the receiver noise signal.

If the masking threshold of the receiver noise signal is greater than or equal to the frequency magnitude of the transmitter speech signal in a specific critical band in operation 324, the speech enhancer 118 determines that the transmitter speech signal is masked with the receiver noise signal.

Then the speech enhancer 118 increases a sound pressure level of the transmitter speech signal in operation 326. That is, the speech enhancer 118 increases the frequency magnitude of the transmitter speech signal in the specific critical band so that the frequency magnitude of the transmitter speech signal is greater than the masking threshold of the receiver noise signal.

Here, if the frequency magnitude of the transmitter speech signal is increased, the frequency magnitude of a residual transmitter noise signal that has not been completely canceled in the transmitter noise canceller 116 may also be increased together. Thus, the speech enhancer 118 returns to operation 308 to remove the frequency magnitude-increased residual noise signal from the frequency magnitude-increased speech signal (hereinafter referred to as a "first transmitter speech signal").

Then, the above-described operations 320 to 324 are re-performed. The operations 320 to 324 are repeated until the frequency magnitude of the first transmitter speech signal is greater than the masking threshold of the receiver noise signal in operation 324.

However, if the masking threshold of the receiver noise signal is less than the frequency magnitude of the transmitter speech signal in the specific critical band, the speech enhancer 118 determines that the first transmitter speech signal is not masked with the receiver noise signal. That is, the speech enhancer 118 determines that the first transmitter speech signal is articulated and proceeds to operation 328.

In operation 328, the speech enhancer 118 synthesizes the transmitter signal divided on a frame-by-frame basis, and outputs the synthesized transmitter signal to the signal encoder 120. Then, in operation 330, the signal encoder 120 encodes the transmitter signal and transmits the encoded signal to the receiver via the antenna.

As described above, in an embodiment of the present general inventive concept, the transmitter improves intelligibility of the transmitter speech signal by considering the receiver's noise signal as well as the transmitter's noise signal.

In addition, since the transmitter increases a sound pressure level of the transmitter speech signal before transmission, the user of the receiver can listen to the more articulated transmitter speech signal even though the receiver cannot increase the SPL of the transmitter speech signal.

Although the transmitter performs both the process of predicting the receiver noise signal and the process of increasing the sound pressure level of the transmitter speech signal in the foregoing transmitter's operation, it will be understood by those skilled in the art that the transmitter may perform the two processes independently according to an embodiment of the present general inventive concept.

Figure 4:
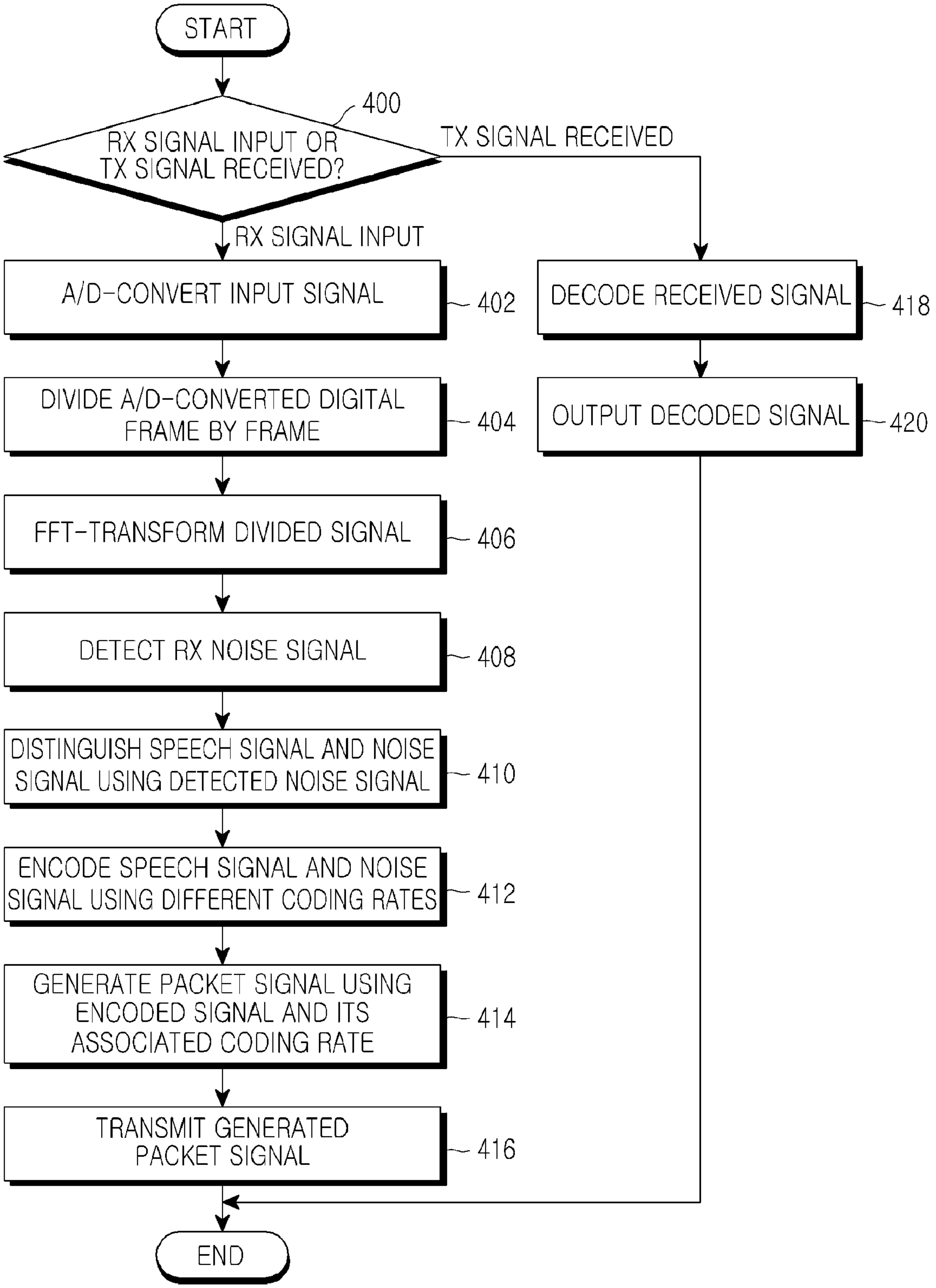
FIG. 4 illustrates an operation of a receiver to improve intelligibility of a speech signal according to an embodiment of the present general inventive concept.

FIG. 4 illustrates an operation of a receiver to improve intelligibility of a speech signal according to an embodiment of the present general inventive concept. For a better understanding of the present general inventive concept, a description of FIG. 4 will be given with reference to the above-described structure of the receiver in FIG. 2.

Referring to FIG. 4, when the receiver signal is input via the microphone 198 in operation 400, the ND converter 200 converts the input receiver signal into a digital signal in operation 402. The input receiver signal may include a speech signal and/or a noise signal.

In operation 404, the framer 202 divides the digital signal converted from the receiver signal in units of a predetermined frame. In operation 406, the FFT unit 204 FFT-transforms the receiver signal divided on a frame-by-frame basis into a frequency-domain signal. The FFT unit 204 outputs the frequency-domain signal transformed from the receiver signal to the noise detector 206 on a frame-by-frame basis.

In operation 408, the noise detector 206 detects the receiver noise signal by determining if the current input frame is a frame with a speech signal or a frame with a noise signal. In operation 410, the noise detector 206 can separate the receiver signal into a frame with a speech signal and a frame with a noise signal according to the noise signal detection process. The noise detector 206 outputs signal identification information to identify the speech signal frame and the noise signal frame, to the signal encoder 208 along with the receiver signal.

In operation 412, the signal encoder 208 encodes the speech signal frame and noise signal frame distinguished based on the signal identification information using different coding rates. In operation 414, the signal encoder 208 generates a packet signal using the encoded signal and the coding rate corresponding to the encoded signal. When the packet signal is generated, the antenna 212 transmits the generated packet signal to the transmitter in operation 416.

However, if the transmitter signal is received through the antenna 212 in operation 400, the signal decoder 210 decodes the received transmitter signal in operation 418. Thereafter, in operation 420, the speaker 214 outputs the decoded transmitter signal to the outside.

As described above, because the receiver proposed in an embodiment of the present general inventive concept receives the sound pressure level-increased speech signal from the transmitter, the receiver does not need to increase an SPL of the transmitter signal separately.

Further, in an embodiment of the present general inventive concept, since the receiver generates and transmits the packet signal such that the noise signal and the speech signal may be distinguished in the receiver signal, the transmitter can predict the receiver's noise signal more easily.

As is apparent from the foregoing description, according to exemplary embodiments of the present general inventive concept, the transmitter can cancel the transmitter noise signal from the transmitter signal and enhance the transmitter speech signal from which the transmitter noise signal is cancelled. In addition, according to the present general inventive concept, the transmitter can estimate the receiver noise signal as well as the transmitter noise signal. Further, the transmitter can prevent distortion of the transmitter speech signal by enhancing the transmitter speech signal based on the predicted receiver noise signal. Moreover, the transmitter can accurately determine a noise signal cancellation by considering the receiver noise signal as well as the transmitter noise signal. In addition, the receiver can receive the intensified transmitter speech signal from the transmitter even though the receiver cannot enhance the transmitter speech signal.

Figure 5A:
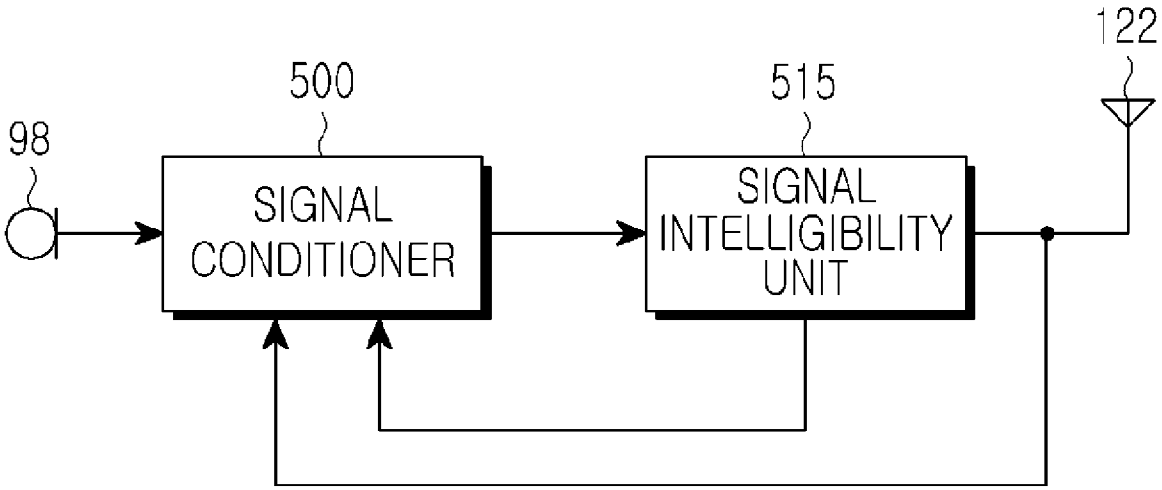
FIGS. 5A-5C illustrate a structure of a transmitter apparatus.
Figure 5B:
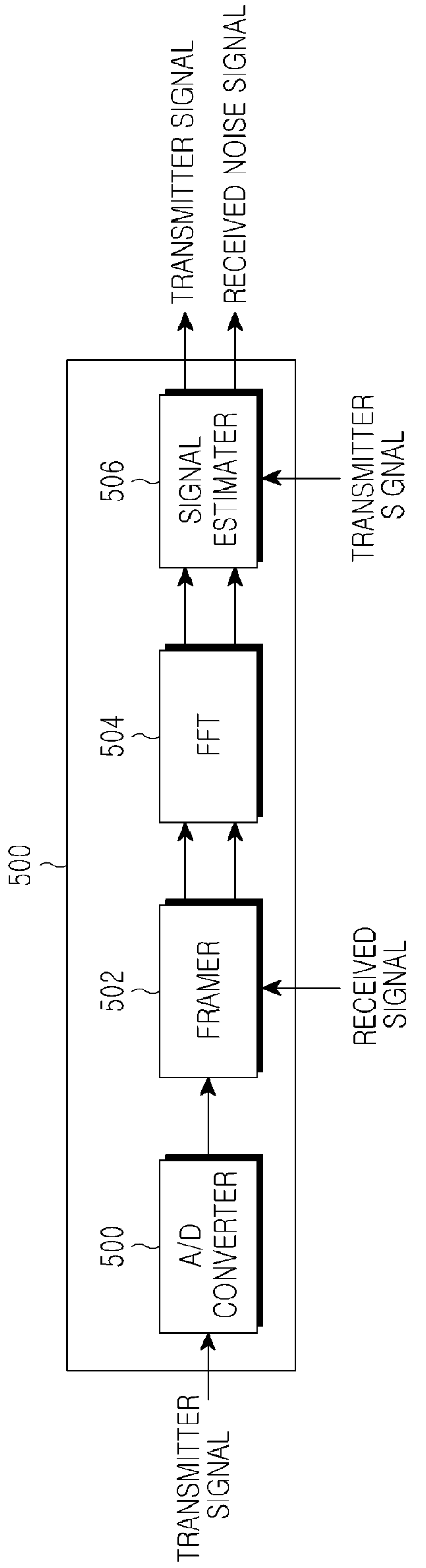
Figure 5C:
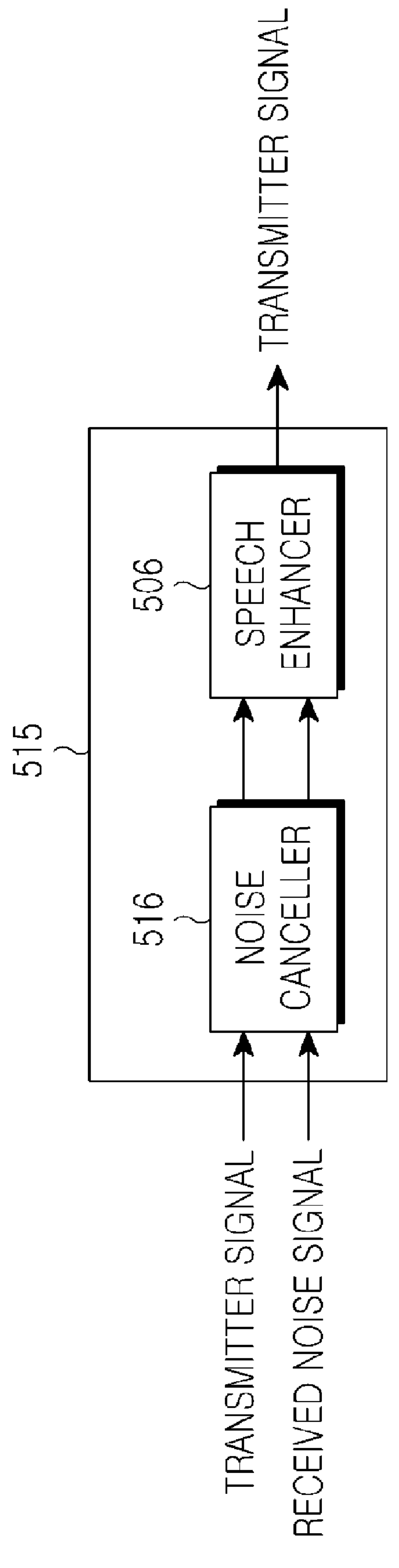

FIGS. 5A-5C illustrate a transmitter apparatus according to an embodiment of the present general inventive concept.

Referring to FIG. 5A, the communication system may include an audio input device 98, a signal conditioner 500, a signal intelligibility unit 515, and an antenna 518. The audio input device 98 may be a microphone, for example, to receive a speech and to convert the speech into an electrical signal. The electrical signal is input into a signal conditioner 500. As shown in FIG. 5B, the signal conditioner 500 may include one or more of an analog to digital converter 100, a framer 502, a fast Fourier transform unit 504, and a signal estimator 506. The transmission signal may be processed as described above with respect to FIG. 1.

The transmitter apparatus may also receive a received signal from a receiver, and the received signal may be input into the signal conditioner 500. For example, referring to FIG. 5B, the received signal may be input directly into the framer 502 to be divided into frames, as discussed above with respect to FIG. 1. Alternatively, a signal conditioner 500 may include separate units for the transmission and received signals, respectively. For example, the signal conditioner 500 may include two framers 502 and two fast Fourier transform units 504, one each for the transmitter signal and the received signal, respectively. The signal conditioner 500 may also include two framers 502, and only one fast Fourier transform unit 504, in which case the transmitter and received signals framed by respective framers 502 may be input into one fast Fourier transform unit 504.

The transmission and received signals may be input into a signal estimator 506. As discussed above regarding FIGS. 1 and 3, the signal estimator 506 may determine a noise masking threshold of the received signal and a frequency magnitude of the transmission noise signal, and may output the respective information to the signal intelligibility unit 515. The signal estimator 506 may also determine the masking threshold of the transmitter speech signal and the frequency magnitude of the transmitter noise signal, according to an embodiment.

As shown in FIG. 5C, the signal intelligibility unit 515 may include either a noise canceller 516, a speech enhancer 518, or both. When the signal intelligibility unit 515 includes a noise canceller 516, the noise canceller 516 may compare the masking threshold of the received noise signal to the frequency magnitude of the transmission noise signal, as discussed above with respect to FIGS. 1 and 3. Alternatively, the noise canceller 516 may compare the masking threshold of the transmitter speech signal with the frequency magnitude of the transmitter noise signal, as discussed above. When the signal intelligibility unit 515 includes a speech enhancer 518, the speech enhancer may compare a transmission speech signal to the masking threshold of the received noise signal, as discussed above with respect to FIGS. 1 and 3.

As discussed above with respect to FIGS. 1 and 3, the signal intelligibility unit 515 may either output a transmission signal including a speech signal and a noise signal to the noise estimator 506 (after increasing a sound pressure level of the transmitter signal), or to the antenna 522, depending upon the outcome of the comparison by the speech enhancer 518. When the signal intelligibility unit 515 does not include a speech enhancer 518, the noise canceller 516 may output a transmission signal directly to the antenna 122.

The transmission apparatus may also include a signal encoder (not shown in FIG. 5A) to receive a transmission signal, encode the signal, and output the signal to the antenna 122. In addition, the transmission apparatus may include a decoder (not shown in FIG. 5A) to decode the received signal from the antenna 122 and output the decoded received signal to the signal conditioner 500.

According to the embodiment of FIGS. 5A-C, the transmitter apparatus may include one noise estimator to estimate both the transmission and received signals. In addition, the signal conditioner may include either a single set of units (e.g. one framer and one FFT) to input conditioned signals into the noise estimator, or it may include separate units for each of the transmission and received signals.

While the general inventive concept has been shown and described with reference to certain exemplary embodiments thereof, it will be understood by those skilled in the art that various changes in form and details may be made therein without departing from the spirit and scope of the general inventive concept as defined by the appended claims and their equivalents.

What is claimed is:

1. A method of transmitting a signal by a transmitter in a communication system, comprising:

estimating a receiver noise signal received from a receiver; and increasing an intelligibility of a transmitter signal including a transmitter speech signal and a transmitter noise signal using the estimated receiver noise signal, wherein increasing the intelligibility of the transmitter signal comprises:

estimating the transmitter noise signal;

comparing the transmitter noise signal with the receiver noise signal;

decreasing the transmitter noise signal to have a value less than the receiver noise signal when the transmitter noise signal is greater than or equal to the receiver noise signal; and comparing the receiver noise signal with the transmitter speech signal.

2. The method of claim 1, further comprising:

increasing a sound pressure level (SPL) of the transmitter speech signal, when it is determined that the receiver noise signal is greater than or equal to the transmitter speech signal.

3. The method of claim 2, further comprising:

estimating a first transmitter noise signal being different from the transmitter noise signal from a first transmitter speech signal indicative of the sound pressure level-increased transmitter speech signal to obtain a second analyzed transmitter noise signal;

decreasing the first transmitter noise signal to have a value less than the receiver noise signal when the first transmitter noise signal is greater than or equal to the receiver noise signal; and comparing the receiver noise signal with the first transmitter speech signal.

4. The method of claim 3, further comprising:

transmitting the first transmitter speech signal to the receiver when the receiver noise signal is less than the first transmitter speech signal.

5. The method of claim 3, further comprising:

increasing a sound pressure level of the first transmitter speech signal when the receiver noise signal is greater than or equal to the first transmitter speech signal, and repeating the operations of:

estimating a first transmitter noise signal being different from the transmitter noise signal from a first transmitter speech signal indicative of the sound pressure level-increased transmitter speech signal to obtain a second analyzed transmitter noise signal;

decreasing the first transmitter noise signal to have a value less than the receiver noise signal when the first transmitter noise signal is greater than or equal to the receiver noise signal; and comparing the receiver noise signal with the first transmitter speech signal.

6. A transmitter to transmit a signal in a communication system, comprising:

a receiver noise estimator to estimate a receiver noise signal received from a receiver; and an increaser to increase an intelligibility of a transmitter signal including a transmitter speech signal and a transmitter noise signal using the receiver noise signal, wherein the increaser comprises:

a transmitter noise estimator to estimate the transmitter noise signal;

a noise canceller to compare the transmitter noise signal with the receiver noise signal, and to decrease the transmitter noise signal to have a value less than the receiver noise signal when the transmitter noise signal is greater than or equal to the receiver noise signal; and a speech enhancer to compare the receiver noise signal with the transmitter speech signal.

7. The transmitter of claim 6, wherein:

the speech enhancer increases a sound pressure level (SPL) of the transmitter speech signal when the receiver noise signal is greater than or equal to the transmitter speech signal.

8. The transmitter of claim 6, wherein:

the transmitter noise estimator estimates a first transmitter noise signal being different from the transmitter noise signal from a first transmitter speech signal indicative of the sound pressure level-increased transmitter speech signal and transmits the first transmitter noise signal to the noise canceller, the noise canceller decreases the first transmitter noise signal to have a value less than the receiver noise signal when the first transmitter noise signal is greater than or equal to the receiver noise signal and transmits the second transmitter signal to the speech enhancer, and the speech enhancer compares the receiver noise signal with the first transmitter speech signal and transmits the first transmitter speech signal to an antenna to transmit the first transmitter speech signal to the receiver when the receiver noise signal is less than the first transmitter speech signal.

9. The transmitter of claim 8, wherein the speech enhancer increases a sound pressure level of the first transmitter speech signal when the receiver noise signal is greater than or equal to the first transmitter speech signal, and the following operations are repeated:

the transmitter noise estimator estimates a first transmitter noise signal being different from the transmitter noise signal from a first transmitter speech signal indicative of the sound pressure level-increased transmitter speech signal;

the noise canceller decreases the first transmitter noise signal to have a value less than the receiver noise signal when the first transmitter noise signal is greater than or equal to the receiver noise signal and transmits the second transmitter signal to the speech enhancer; and the speech enhancer compares the receiver noise signal with the first transmitter speech signal.

* * * * *